United States Patent [19]

Watts

[11] 4,443,683
[45] Apr. 17, 1984

[54] ANGULAR AND SWIVELING HEAD FOR GAS CONSUMING ELECTRIC WELDING TORCHES

[76] Inventor: Donald R. Watts, 6004 4th St. Ct. NE., Tacoma, Wash. 98422

[21] Appl. No.: 286,019

[22] Filed: Jul. 22, 1981

Related U.S. Application Data

[63] Continuation-in-part of Ser. No. 278,679, Jun. 29, 1981, abandoned.

[51] Int. Cl.³ .............................................. B23K 9/16
[52] U.S. Cl. .................................... 219/74; 219/137.9
[58] Field of Search ................ 219/136, 72, 74, 75, 219/137.9

[56] References Cited

U.S. PATENT DOCUMENTS

| | | | |
|---|---|---|---|
| 992,966 | 5/1911 | Kurz et al. | 431/280 |
| 2,797,301 | 6/1957 | Copleston | 219/75 |
| 2,986,624 | 5/1961 | Marta | 219/75 |
| 3,007,032 | 10/1961 | Whiteman | 219/137.42 |
| 3,109,916 | 11/1963 | Kilburn et al. | 219/75 |
| 4,145,595 | 3/1979 | Keller et al. | 219/137.9 |
| 4,268,740 | 5/1981 | Sanders | 219/75 |

FOREIGN PATENT DOCUMENTS 230345  3/1969  U.S.S.R. ................... 219/75

Primary Examiner—B. A. Reynolds
Assistant Examiner—Alfred S. Keve
Attorney, Agent, or Firm—David L. Garrison; Ford E. Smith

[57] ABSTRACT

A gas consuming electric welding torch has a swiveling torch head which is angularly oriented with respect to the torch handle. Inert gas and electrical current flow through a conductive passageway into a swivel body. A swivel fastener extends through the swivel body and is fastened to threads in a piece extending radially from the torch head. Insert gas may flow through the swivel fastener and into the torch head.

3 Claims, 3 Drawing Figures

ANGULAR AND SWIVELING HEAD FOR GAS CONSUMING ELECTRIC WELDING TORCHES

This application is a continuation-in-part of my previous application entitled GAS SHIELDED ELECTRIC WELDING TORCH, Ser. No. 278,679, filed June 29, 1981, now abandoned.

TECHNICAL FIELD

The technical field of this invention is inert gas welding equipment or other welding equipment wherein a supply of gas and elecrical current are provided to the electrode holder, or torch.

BACKGROUND ART

Electric welding torches having passages for gas to flow therethrough are well-known in the art of welding. A variety of configurations are known including torches with flexible sections between the handle and torch head. Prior art torches are limited by their difficulty in welding along walls, under pipes and in similar awkward positions.

DISCLOSURE OF INVENTION

It is an object of the invention to provide a welding torch having a torch head which can be swiveled about the torch handle without entangling the supply cable and gas line.

It is an object of the invention to provide a swiveling torch head which is angularly oriented with respect to the torch handle thereby making the torch easier to use in confined areas.

The invention is typically used in electrical arc welding torches having an inert gas shield. Such torches require that both electrical current and inert gas be supplied to the torch electrode. It is also possible to use the invention with other types of electrical arc welding torches which consume gas for other purposes, such as for cooling of the torch. The swivel connection of the invention is located between the torch handle and torch head. The swivel connection comprises a swivel body, swivel seat and swivel fastener.

The swivel body is provided with an angular bend adjacent to where it connects to the torch handle. This angular bend is preferably about 40° of arc. The swivel body has an internal passageway which allows gas to flow from the torch handle to the swivel seat. The passageway may be formed by a piece of metallic tubing which also acts as the electrical conductor. It is also possible that the electrical conductor be contained within the swivel body without enclosing or contacting the flowing gas.

The swivel seat is an annular shaped piece through which the swivel fastener is installed. The seat is made of an electrically conductive material such as copper or brass. The passageway in the swivel body is connected to a port in the swivel seat which allows gas to flow from the passageway into the interior of the annular shaped seat. Electricity is conducted from the metallic tubing of the swivel body to the swivel seat by an electrical connection therebetween. The swivel seat contacts a receiving piece located in the torch head in a face-to-face orientation, thereby providing means for removing heat from the torch head and for conducting electricity.

The swivel fastener can have a threaded stem which screws into the receiving piece in the torch head to draw it into the swivel body. Other rotational fastening means can also be used. The swivel fastener acts as the swivel axis about which the torch head is rotated. Electricity can flow from the swivel seat to the fastener, and from there to the torch head. Gas flows to the torch head through a port and interior passageway formed in the fastener stem.

BEST MODE OF CARRYING OUT THE INVENTION

Figure 1:
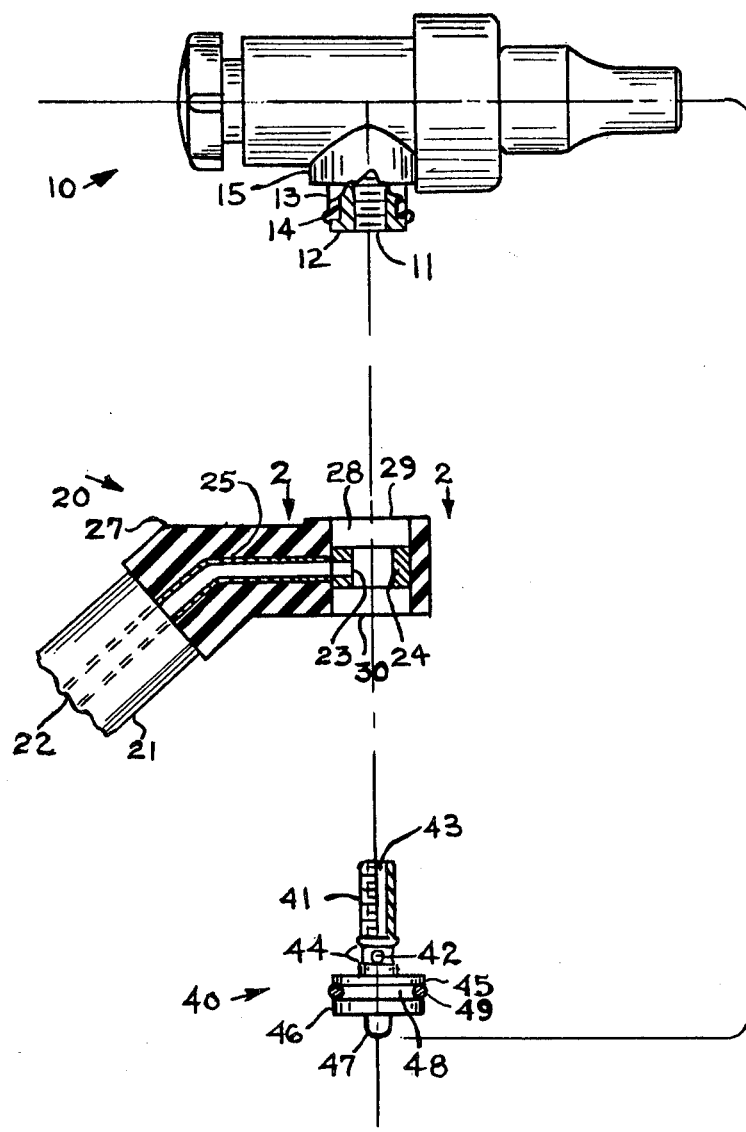
FIG. 1 is an exploded side view of the invention. Portions have been broken away and are shown in section.

As shown in FIG. 1 there are three major components of the invention, the swivel body 20, the torch head 10, and the swivel fastener 40. The swivel body 20 can be incorporated into the torch handle 21 or as a part of the stem for an in-handle valve arrangement (not shown).

The swivel body 20 is provided with an angular bend 27. Angular bend 27 can be a variety of angular values for different applications. Forty degrees, 40°, has been found most satisfactory for all-around use. Swivel body 20 also has a circular opening 28 formed therein. Circular opening 28 has a swivel seat 24 mounted approximately midway thereof.

Electrical current and gas, such as inert gas for inert gas shielded welding, are supplied to the swivel body through passage 22 in stem or handle 21. Gas passing through passage 22 continues through the swivel body 20 until it exits through port 23 formed in the swivel seat 24. Passage 22 can be defined by an electrically conductive conduit 25 which transmits electrical current to swivel seat 24. Seat 24 is made of an electrically conductive material such as brass. Alternative means for supplying electricity to seat 24 are also possible, such as a wire embedded in the body 20. Swivel body 20 is made predominantly of dielectric heat-resistant plastics.

Torch head 10 is provided with a threaded passage 11 in receiving piece 12 which receives the threaded stem 41 of fastener 40. Receiving piece 12 is surrounded by a resilient seal 13 which is provided with a raised ridge 14 which acts to seal the inert gas from leakage. Resilient seal 13 is made from dielectric materials.

Swivel fastener 40 has a threaded stem 41 which has a passageway 43 through the core thereof. Port 42 passes between passageway 43 and relieved shank region 44 of fastener 40, thereby allowing gas to flow into and through passageway 43. Fastener 40 has an electrically conductive contact plate 45 which is drawn against seat 24 when the swivel is assembled. The face-to-face contact between contact plate 45 and seat 24 provides a good electrical connection between seat 24 and fastener 40 and a means for removing heat from torch head 10.

Attached to contact plate 45 is a fastener head 46. Fastener head 46 is made of a dielectric materal and has a groove 48 for holding an o-ring 49. O-ring 49 serves to seal the inert gas from leakage. Fastener head 46 also has a ridge 47 to facilitate turning of the fastener 40.

Figure 3:
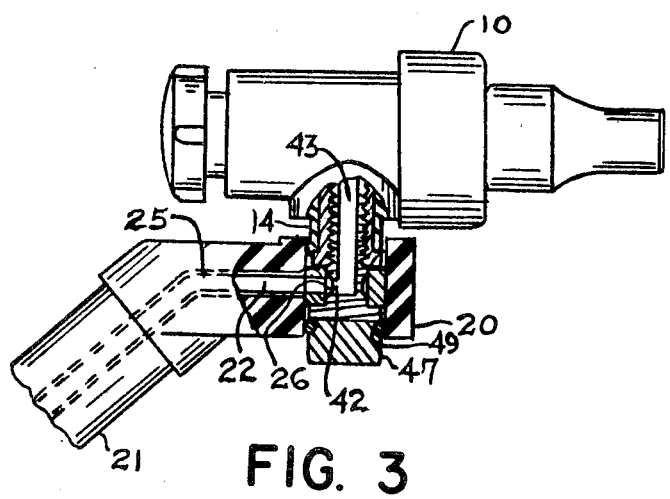
FIG. 3 is an assembled side view of the invention. Portions have been broken away and are shown in section.

The components of FIG. 1 are assembled together to form the torch of FIG. 3. Torch head 10 is usually mounted against the upper part 29 of swivel body 20 so that it is free to rotate 360°. It is also possible to mount torch head 10 against the lower part 30 of swivel body 20 and if the neck 15 is long enough, 360° rotation is possible.

Figure 2:
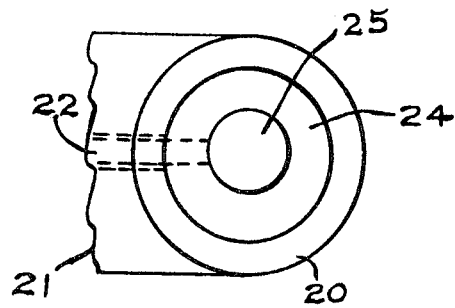
FIG. 2 is a top view along line 2—2 as shown in FIG. 1.

Swivel fastener 40 is positioned through circular opening 25 (FIG. 2) of seat 24 and screwed into the threads 11 of receiving piece 12. Fastener 40 draws torch head 10 into the swivel body 20 so that the lower face of receiver piece 12 is in face-to-face contact with seat 24 thereby providing a good electrical connection and a means for removing heat from torch head 10.

The fastener 40 can be tightened so that the torch head is maintained securely in a fixed angular orientation, or it can be left slightly loose for ready rotation during welding.

When assembled, all exposed surfaces of the torch head 10, swivel body 20, and fastener 30 are covered with dielectric materials for safety purposes.

The raised ridge 14 on resilient seal 13 and the o-ring 49 on fastener 40 act to seal the flowing gas within the annular volume 26 that they define. During operation gas flows through passage 22, port 23 into annular volume 26. From annular volume 26 gas flows through port 42 into passageway 43 and into the torch head. In inert gas welding torches the gas is used to shield the welding zone. Where the gas is used only for cooling it can be vented in any desired manner.

INDUSTRIAL APPLICABILITY

The invention is used predominantly with inert-gas-electrical welding equipment. A torch incorporating the invention is connected in a well-known fashion to the inert gas and electrical power supplies. It can also be used where a gas is used for cooling the welding equipment or for other purposes.

It will be apparent to those skilled in these arts that modifications to the above described invention can be made. The below claims are to be broadly interpreted to include such modifications.

What is claimed is:

1. A gas consuming electrical welding torch having an angular bend at a swivel connection means comprising:
   a torch head having a radially-connected receiving piece extending therefrom, said receiving piece having a surrounding resilient seal and a threaded passage therethrough;
   a swivel body adapted to receive electrical current and inert gas flow through a conductive passageway and including an opening for receiving and sealing said receiving piece therein in a swiveling relationship and an electrically conductive seat means connected to said conductive passageway;
   a swivel fastener for interconnecting said torch head and said fastener having a threaded stem for threading insertion into said threaded passageway in said receiving piece, an electrically conductive contact plate for engaging said conductive seat means to conduct electrical current from said seat means, through said fastener to said torch head and an annular passageway with radial ports to communicate with said conductive passageway and permit flow of gases into said torch head,
   whereby said torch head may be swiveled into convenient operating positions.

2. The welding torch of claim 1 wherein said swivel fastener is provided with a groove for placing a first seal means therein, and said torch head is provided with a second seal means thereon, for preventing inert gas from escaping from said swivel connection; said swivel fastener, said swivel body and said torch head all being provided with a dielectric covering to prevent electric current flow from the torch except at an exposed electrode.

3. The welding torch of claim 2 wherein said swivel body has an angular bend of approximately 40°.

* * * * *